Jan. 23, 1923.

J. G. GRAY.
GYROSCOPIC APPARATUS.
FILED JUNE 19, 1922.

1,442,799

6 SHEETS-SHEET 1

Inventor:
James Gordon Gray,
by Robert Kalm,
Attorneys.

Jan. 23, 1923.
J. G. GRAY.
GYROSCOPIC APPARATUS.
FILED JUNE 19, 1922.
1,442,799
6 SHEETS-SHEET 3
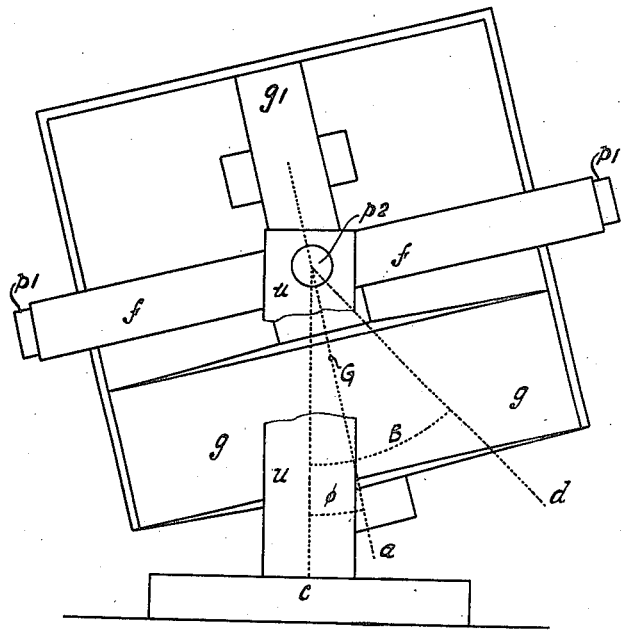
FIG. 4
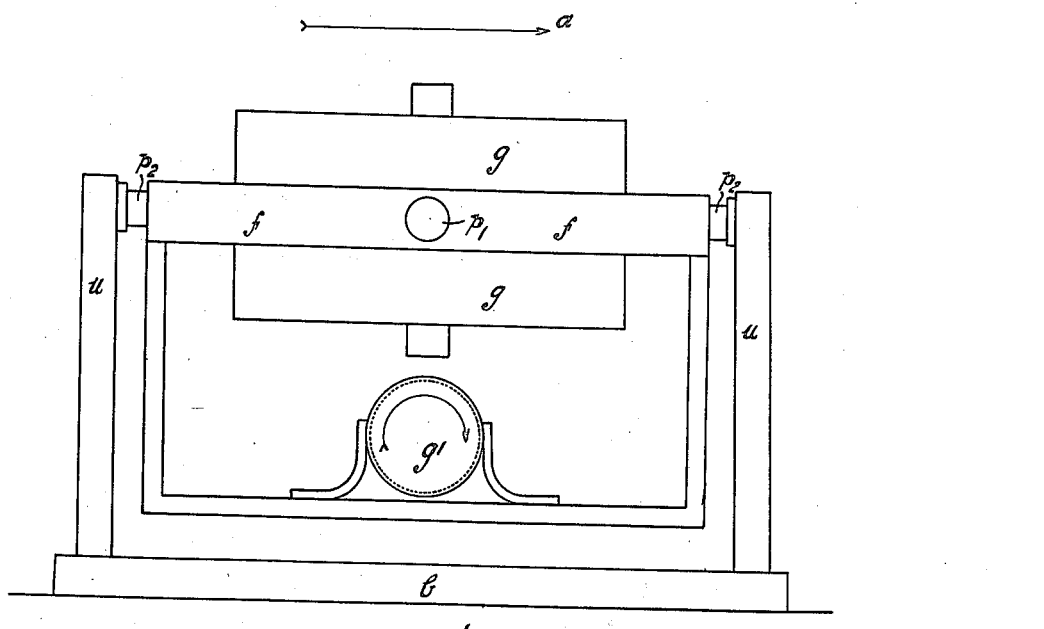
FIG. 4¹
Inventor:
James Gordon Gray
by Ralph Kalvi
Attorneys.

Jan. 23, 1923.

J. G. GRAY.
GYROSCOPIC APPARATUS.
FILED JUNE 19, 1922.

1,442,799

6 SHEETS-SHEET 4

Inventor:
James Gordon Gray,
by Calvert &c.
Attorneys.

Jan. 23, 1923.

J. G. GRAY.
GYROSCOPIC APPARATUS.
FILED JUNE 19, 1922.

1,442,799

6 SHEETS-SHEET 5

Inventor:
James Gordon Gray,
by Robert Kahn,
Attorneys.

Jan. 23, 1923.
J. G. GRAY.
GYROSCOPIC APPARATUS.
FILED JUNE 19, 1922.
1,442,799
6 SHEETS-SHEET 6
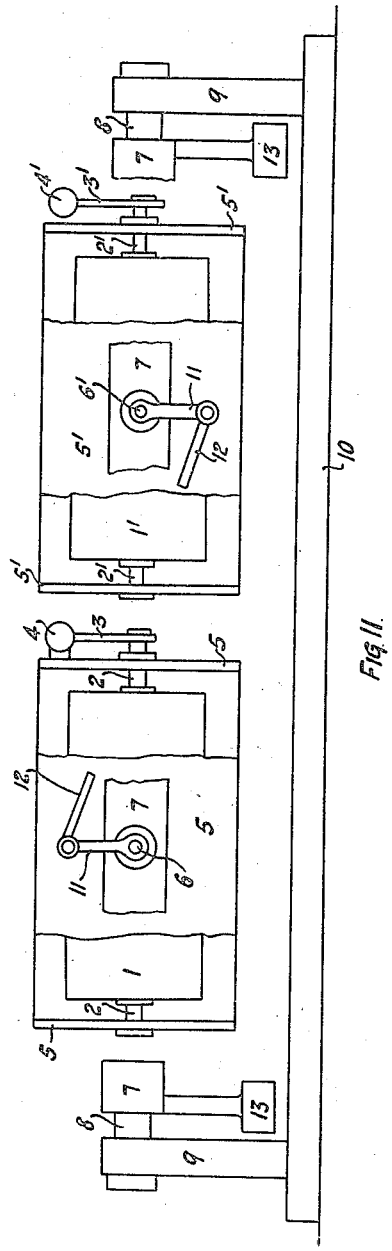
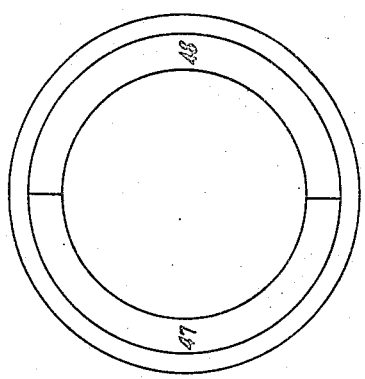
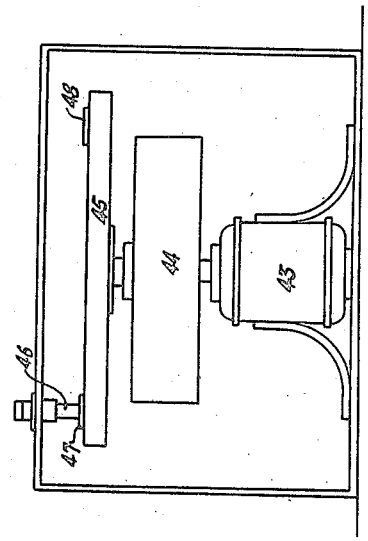

Patented Jan. 23, 1923.

1,442,799

UNITED STATES PATENT OFFICE.

JAMES GORDON GRAY, OF GLASGOW, SCOTLAND.

GYROSCOPIC APPARATUS.

Application filed June 19, 1922. Serial No. 569,406.

*To all whom it may concern:*

Be it known that I, JAMES GORDON GRAY, a subject of the King of the United Kingdom of Great Britain and Ireland, and residing at Glasgow, Scotland, have invented a certain new and useful Improvement in Gyroscopic Apparatus (for which I have filed applications in Great Britain, June 1, 1921, No. 15,252, and June 13, 1921, No. 16,174), of which the following is a specification.

This invention relates to gyroscopic apparatus for use in stabilizing instruments of precision, such as sextants, mirrors for use with artificial horizons, cameras, bombsights, etc., when mounted on marine and aerial craft, and for defining the vertical in such craft in connection, particularly, with gunnery problems.

The chief difficulty experienced in solving the problem of producing satisfactory apparatus for defining the vertical on vehicles arises from the necessity for ensuring that no errors, or at all events only errors of exceedingly small magnitude, in the apparatus shall be introduced by the horizontal accelerations which accompany turning movements of the vehicle on which the apparatus is mounted.

In the present invention in its most complete form two or more gyroscopes are employed to form a pivoted system. The system is provided with gravity control, and the gyroscopes are linked together in such manner that when the vehicle on which the apparatus is mounted moves in a curved path a gyroscopic couple is produced, as a consequence of the turning of the vehicle, which is equal and opposite to the so-called centrifugal couple which acts on the pivoted system. This method of mounting gyroscopes has been already pointed out in patent specification No. 1,311,768. The present invention comprises improved means of mounting the gyroscopes, and of stabilizing the system with respect to the vertical, and notably a rotating commutator for use in operating horizontal pendulums mounted on the pivoted system.

Figure 1:
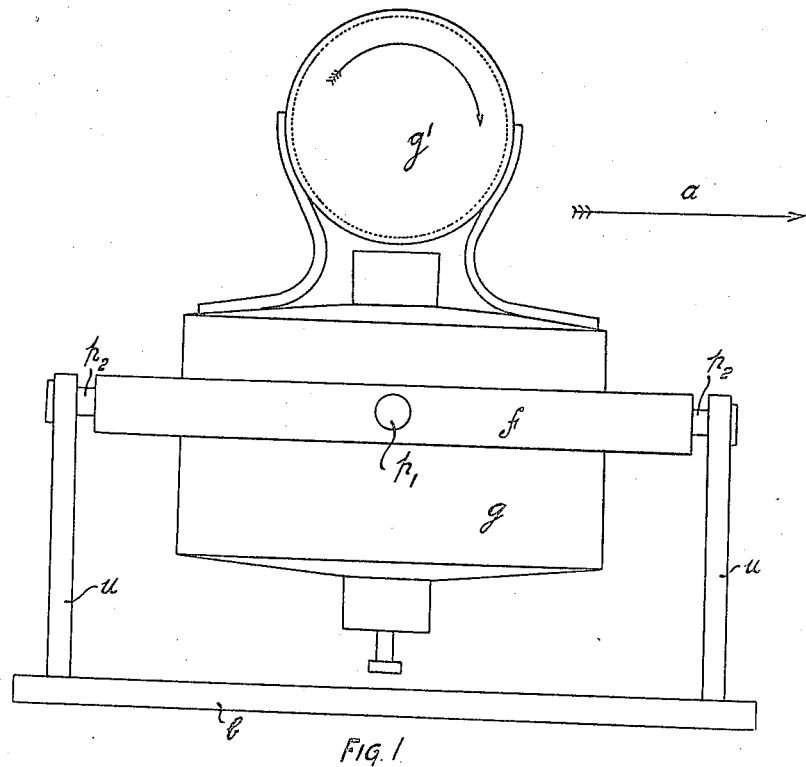
Figure 2:
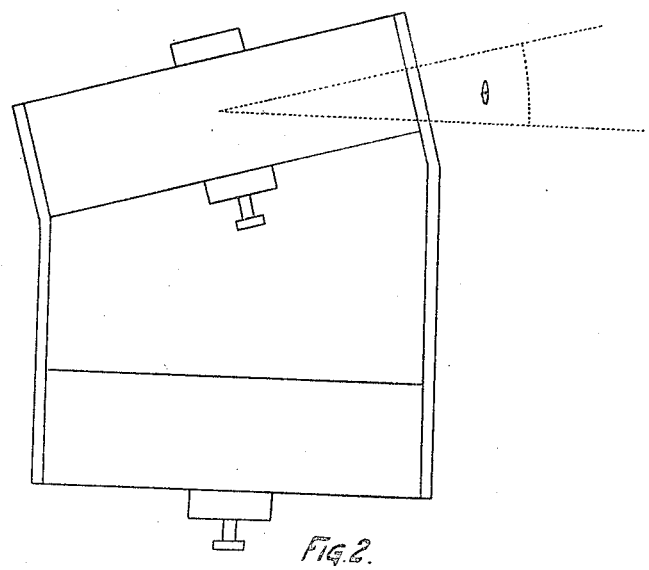
Figure 3:
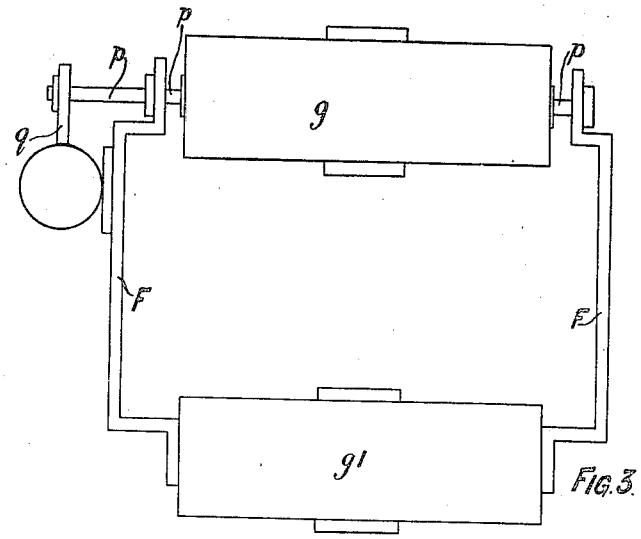
Figure 3A:
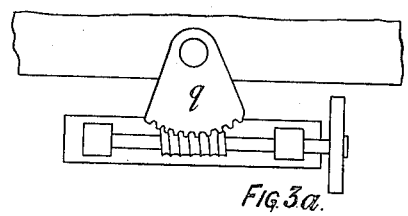
Figure 3:
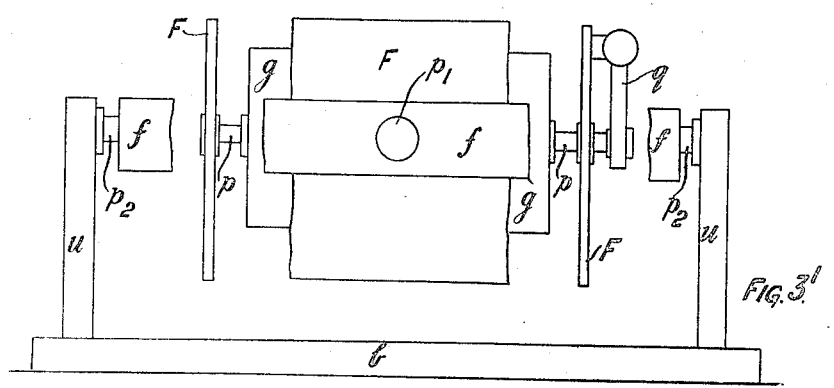
Figure 5:
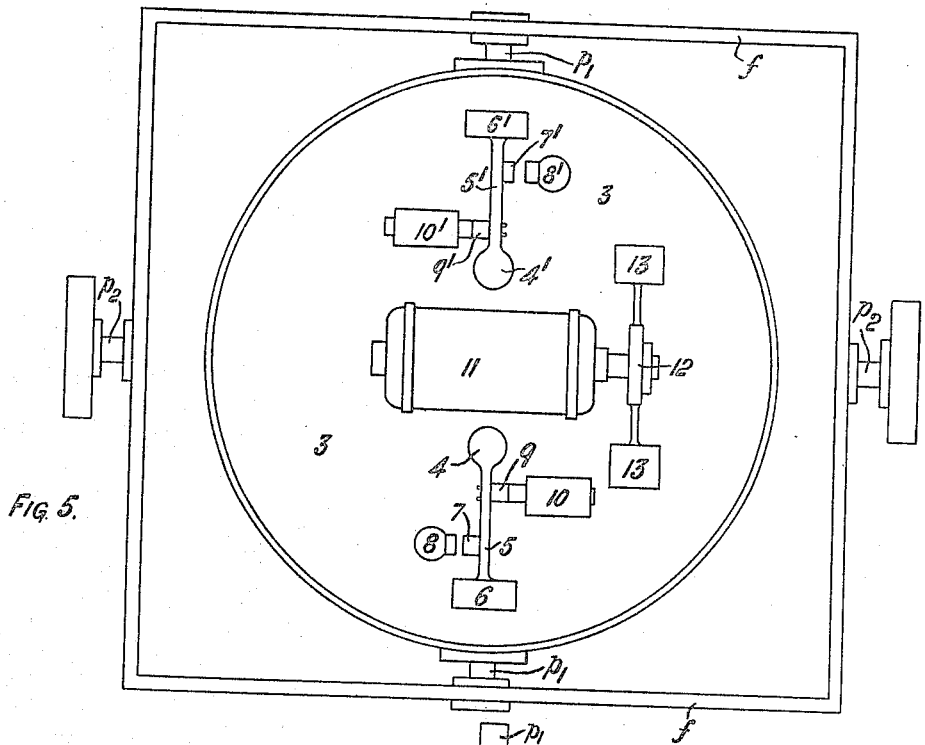
Figure 6:
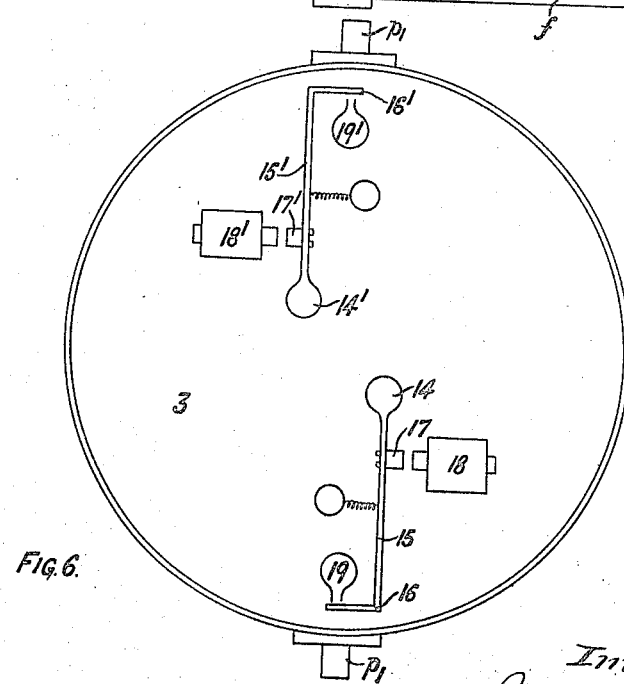
Figure 7:
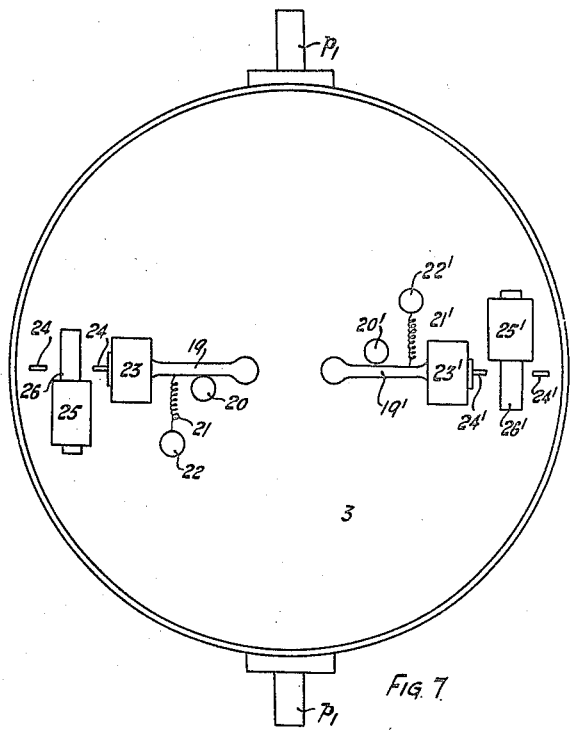
Figure 8:
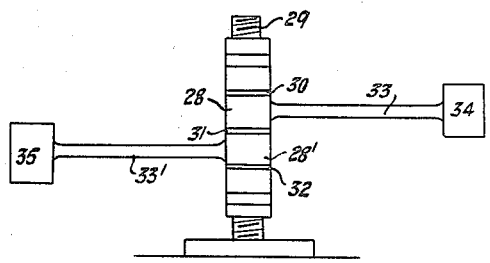
Figure 9:
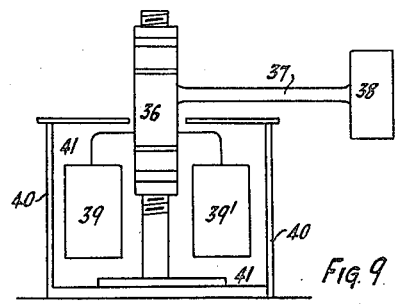

In the accompany drawings Fig. 1 is a diagrammatic view showing a main gyroscope associated with an auxiliary gyroscope having its axis perpendicular to that of the main gyroscope. Fig. 2 is a diagram showing two gyroscopes, one of which is tilted with respect to the vertical. Fig. 3 is a diagrammatic elevation and Fig. 3$^a$ a detail view showing two gyroscopes with provision for varying the inclination of one with respect to the vertical. Fig. 3' is a diagrammatic elevation showing an arrangement including a single gyroscope. Fig. 4 shows a diagrammatic arrangement of a main gyroscope and an auxiliary gyroscope. Fig. 4' is a diagrammatic elevation showing a variation. Figs. 5, 6 and 7 are diagrammatic plans showing three forms of erecting gear. Figs. 8 and 9 are detail views in elevation. Figs. 10 and 10$^a$ are elevation and plan views showing a rotary commutator hereinafter referred to. Fig. 11 is an elevation showing a modification comprising gyroscopes spun in opposite directions.

Referring to Fig. 1, rigidly attached to the gyroscope $g$ (the main gyroscope of the stabilizer) is an auxiliary gyroscope $g'$ with its axis perpendicular to that of $g$. Thus, when the pivoted system is upright the axis of $g'$ is horizontal. The pivoted system is so mounted in the frame $f$ that the axis of $g'$ is perpendicular to the pivots $p_2$, $p_2$, which lie fore and aft with respect to the aeroplane, say. Thus the axis of $g'$ lies athwart the aeroplane.

Consider the action of this apparatus when mounted on an aeroplane which is moving in the direction indicated by the arrow $a$. Let the pivoted system be mounted so that its centre of gravity lies below the plane of the pivots $p_1$, $p_2$, $p_2$, and let the direction of rotation of the gyroscope $g'$ be that indicated by the curved arrow. Suppose the apparatus initially upright and let the aeroplane move in a curved path.

The couple experienced by the pivoted system as a result of the centrewards acceleration of the aeroplane is $MV\psi h$, where M is the total mass of the pivoted system, $h$ the distance of its centre of gravity below the plane of the pivots, V the linear speed of the aeroplane, and $\psi$ its angular speed in azimuth. This couple is applied about the pivots $p_2$, $p_2$. But the gyroscope $g'$ is being turned forcibly in azimuth at angular speed $\psi$, and if $I\omega$ is the angular momentum of $g'$ the pivoted system experiences a couple due to this cause of amount $I\omega\psi$. With the direction of spin of $g'$ shown this couple is applied about the pivots $p_2$, $p_2$ in the direction opposed to that of the couple $MV\psi h$. This holds for both directions of turning in azimuth. The resultant couple is thus $(MVh-I\omega)\psi$, and is zero when $MVh=I\omega$. Since the periodic time of the pivoted system is given by $T=2\pi Cn/(Mgh)$, where $Cn$ is the angular momentum of the gyroscope the condition that the resultant couple should be zero becomes $$\frac{2\pi V}{gT}Cn = I\omega \text{ or } \frac{I\omega}{Cn} = \frac{2\pi V}{gT}$$

If the condition is not exactly fulfilled we have $(MVh-I\omega)\psi$ for the resultant couple, and for the angular speed at which the system turns about pivots $p_1$ $(MVh-I\omega)\psi/Cn$. Let there be, say, a 5% error in $I\omega$, so that say $I\omega = 19\ MVh/20$; then the angular speed of the pivoted system about $p_1$ is $MVh\psi/(20Cn)$. In other words, when the aeroplane is in curved flight the virtual precessional period of the system is $20T$, $T$ being the actual precessional period. Thus, if the period is 6 minutes the system behaves during the curved motion of the aeroplane as if the periodic time of the gyroscopic system was 2 hours.

One practical construction is illustrated diagrammatically in Figure 2. Two large gyroscopes are employed, one of which is tilted with respect to the vertical, as shown. The system is attached to the frame $f$ so that the horizontal component of spin, due to the tilt of the upper gyroscope, lies athwart the aeroplane. Let the gyroscopes be identical, and let the angular momentum of each be $Cn$. The condition required for complete compensation becomes $$\frac{Cn \sin \theta}{Cn + Cn \cos \theta} = \frac{2\pi V}{gT} \text{ or } \tan \tfrac{1}{2}\theta = \frac{2\pi V}{gT}.$$

In practice the two gyroscopes are mounted within a frame (Figs. 3 and 3ª) one rigidly, the other so that the angle $\theta$ may be adjusted in accordance with the above equation. The value of $V$ above is the air speed of the aeroplane or airship. In the case of a ship the value of $V$ is the speed of the ship relative to the water.

The construction will be clear from the figures. The two gyroscopes $g_1$ and $g_2$ are mounted on the frame F, $g_1$ rigidly, $g_2$ on pivots $p$, $p$, as shown. One of the pivots is extended and carries at its extremity a quadrant $q$. This quadrant may be turned by means of a worm as shown. The pivots $p$, $p$, lie fore and aft with respect to the craft or vehicle on which the apparatus is mounted. The stabilizing gear may conveniently occupy the space between the gyroscopes.

One advantage gained by using the two gyroscopes in the manner described will be obvious. When the pivoted system is provided with bottom weight any small change in the position of the centre of gravity of the pivoted system does not appreciably alter the resting position of the system.

In the construction described above two gyroscopes are employed. This is convenient but not essential. In Figure 3' is shown an arrangement of the invention in which one gyroscope is used. The gyroscope $g$ is mounted on two pivots $p$, $p$, within a frame F, and as before one pivot is extended and carries a quadrant $q$, which, with a worm adjustment, allows of the gyroscope being turned, with respect to the frame F, on the pivots $p$, $p$. The frame F is attached by means of pivots $p_1$ to a gimbal frame $f$ which in turn is attached by means of pivots $p_2$ $p_2$ to uprights $u$, $u$ carried by a base $b$.

The pivots $p_2$ $p_2$ lie fore and aft with respect to the moving vehicle. The system, composed of the gyroscope $g$ and frame $f$ is mounted on the pivots $p_1$ so that it possesses gravity control, and the gyroscope is set relatively to the frame F so that the condition $MVh = Cn \sin \theta$ is fulfilled.

The arrangements described above are of the greatest importance inasmuch as they render possible the construction of a stabilizer capable of finding the true vertical, when displaced from the true vertical, even when the vehicle on which it is mounted is turning in azimuth. For example, the device, when provided with a suitable erector, is capable of finding the true vertical when functioning on board a ship which is continually manoeuvering, or which is moving continually in a curved path. Not only is the device blind to the apparent vertical, so to speak, in the presence of the accelerations which accompany curved motion, but it retains its sense of the true vertical. The importance and value of such a device need not be enlarged upon.

In Figure 4 we suppose, for the purpose of illustration, that the horizontal component of spin required to neutralize, wholly or partially, the so-called centrifugal couple which acts on the pivoted system when the craft or vehicle is turning, is supplied by a small gyroscope $g'$, which is rigidly attached to the large gyroscope $g$ as in Fig. 1. Its spin is clockwise as seen from the right of the diagram. The system is pivoted at $p_1$ $p_1$ to a frame $f$ and the frame is pivoted at $p_2$ to uprights $u$. The device is supposed mounted on a vehicle with the pivots $p_2$ lying fore and aft. The vehicle is supposed to be moving away from the reader with speed V (relative to the medium in which it moves) and to be turning in azimuth with angular speed $\psi$, the centre of the path being to the left of the diagram.

At the instant the pivoted system is supposed inclined to the vertical at an angle $\phi$, so that its centre of gravity lies on $p_2$ $a$, which makes an angle $\phi$ with the true vertical $p_2 c$. The apparent vertical is $p_2 d$, inclined to the true vertical at an angle $\beta$ given by $\tan \beta = V\psi/g$.

The pivoted system is, at the instant, being accelerated towards the centre of the path, and hence there is applied to it at $p_2$ a horizontal force of amount $MV\psi$, where M is the mass of the pivoted system. Applying at G (the centroid of the pivoted system) two equal and horizontal forces, each of amount $MV\psi$, we see that the force of $MV\psi$ applied at $p_2$ is equivalent to an equal force applied at the centroid (which force is available to supply the centrewards acceleration of the system) and a couple of moment $MV\psi h \cos \phi$, where $p_2 G$ is denoted by $h$. This couple is counterclockwise as seen by the reader, and acts about the pivots $p_2$.

The axis of the gyroscope $g'$ is inclined to the horizontal at an angle $\phi$, and hence if $I\omega$ is its angular momentum, there turns in azimuth, at angular speed $\psi$, angular momentum of amount $I\omega \cos \phi$. Hence there is applied to the pivoted system at $p_2$ at each instant a couple of moment $I\omega \cos \phi\psi$. With the direction of spin of $g'$ specified, the direction of this couple is clockwise as seen by the reader.

Further, since the pivoted system is inclined at an angle $\phi$ to the true vertical there acts on the system a couple, due to gravity, of amount $Mgh \sin \phi$.

The resultant couple L, tending to turn the system about the pivots $p_2$ in counterclockwise direction is given by, $$L = MV\psi h \cos \phi - I\omega \cos \phi\psi - Mgh \sin \phi.$$

This couple has a zero value when $$\tan \phi = \psi \frac{(MVh - I\omega)}{Mgh}$$

The above result may also be obtained as follows. At the instant the apparent vertical is inclined to the true vertical at the angle $\beta$. Each particle of matter in the vehicle is situated in a field of force, the amount of which per unit mass is $(g^2 + V^2\psi^2)^{\frac{1}{2}}$ and the direction of which is the apparent vertical. The pivoted system is, at the instant, inclined to the apparent vertical at an angle $(\beta - \phi)$, and hence there is applied to the system, about $p_2$ a couple of moment $M(g^2 + V^2\psi^2)^{\frac{1}{2}} h \sin (\beta - \phi)$. Further the horizontal component of the angular momentum of $g'$ is turning in azimuth at angular speed $\psi$, and hence the resultant couple about $p_2$ in the counterclockwise direction is $$M(g^2 + V^2\psi^2)^{\frac{1}{2}} h \sin (\beta - \phi) - I\omega \cos \phi\psi$$

Now $(g^2 + V^2\psi^2)^{\frac{1}{2}} = g/\cos \beta$ and $\tan \beta = V\psi/g$. Hence the couple has the value given above.

Since there is no resultant couple acting on the system it is in its resting position. If $I\omega = MVh$ then $\phi = 0$. Hence this device, when properly adjusted, and provided with a suitable erector, searches for, and finds, the true vertical even when the vehicle on which it is mounted is turning in azimuth.

The tilted gyroscope must be correctly adjusted in accordance with the above equation. The adjustment is carried out by means of the worm gearing shown in Figure 3. A pointer attached to the quadrant moves against a scale of speeds (air speeds, or log speeds, as the case may be). (An erector not shown in Fig. 3 is mounted in the space between $g'$ and $g^2$; such erectors are shown in Figs. 5, 6, 7 and 8).

Let $I\omega = \frac{19}{20} MVh$, that is suppose an error of 5% made in the setting of the tilted gyroscope. We have $$\tan \phi = \frac{1 V\psi}{20 g}, \tan \beta = \frac{V\psi}{g}$$

and hence $$\tan \phi = \frac{1}{20} \tan \beta$$

Consider the case of a ship moving with a speed (through the water) of 40 feet per second. Let $\psi$ be $1°$ per second. We have $\tan \beta = \frac{40}{57.3 \times 32}$, or $\beta = 1° 15'$. The angle $\phi$ is given by $\tan \phi = 40 (57.3 \times 32 \times 20)$, so that the value of $\phi$ lies between 2 and 3 minutes. Thus the device, so to speak, perceives, not the apparent vertical, but a quasi-apparent vertical inclined at 3 minutes of angle to the true vertical.

Again suppose the device mounted on an aeroplane, which is moving with a linear speed of 100 feet per second and turning in azimuth at the rate of 9° per second. Here $\beta$ has the value of 26.1°, and $\phi$ is 1.3° nearly. If the rate of turning is 1° in 1 second of time, $\beta = 3.1°$ and $\phi$ is less than 1/10th of a degree.

The air speed of an aeroplane, or the speed through the water of a ship, can be ascertained correctly within 5%. In using the device the pivots $p_2$ are, of course, placed fore and aft.

With this compensated gyroscopic system it becomes possible to provide the frame $f$ (Fig. 1) with gravity control with respect to the pivots $p_2$, and the gyroscopic system with gravity control with respect to the pivots $p_1, p_1$. The arrangement must be such that (with the pivots $p_2$ lying fore and aft with respect to the moving vehicle) the couple $I\omega\psi$ balances the total so-called centrifugal couple acting about the pivots $p_2$ as a consequence of the existence of $\psi$.

So arranged, when the system is inclined to the vertical in the absence of horizontal accelerations, the frame oscillates about the pivots $p_2$, and the gyroscopic system about the pivots $p_1, p_1$. The periods of these oscillations are the same and there is a phase difference of $\pi/2$. For many purposes it is convenient to arrange that the amplitude of the oscillations about $p_1, p_1$ shall be greater than that of the oscillations about $p_2$.

In Figure 4' is shown a form of the invention in which the horizontal component of spin required to bring into existence, in the presence of curved motion of the vehicle, a couple opposed to the centrifugal couple, is supplied by a gyroscope $g'$ mounted on the gimbal frame $f$, or the equivalent. The main gyroscope $g$ is attached to the frame $f$, as before; by means of pivots $p_1$ (one pivot is shown) and $f$ is attached to the uprights $u, u$, by means of pivots $p_2\ p_2$. These uprights are carried by a base $b$ which lies fore and aft with respect to the moving vehicle, so that the axis of $g'$ lies athwart the moving vehicle. The direction of motion of the vehicle is indicated by the arrow $a$, and the direction of spin of $g'$ by the curved arrow on $g'$.

The frame $f$, or the equivalent, is mounted on $p_2\ p_2$ so as to possess gravity control with respect to $p_2\ p_2$, and the gyroscope $g$ is rendered pendulous with respect to $p_1$. The angular momentum $I\omega$ of $g'$ is arranged so that the condition $I\omega = MVh$ is fulfilled where $h$ is the distance of the C. G. of the entire pivoted system below the pivots $p_2\ p_2$, and M is the mass of the entire system carried on the pivots $p_2\ p_2$.

This construction has the advantage that the speed of $g'$ may be varied without the pivoted system being disturbed. Thus if $g'$ is being accelerated or retarded the reaction couples introduced have no effect on the system.

For use with this compensated gyroscopic system various forms of erector are employed.

One type of erecting gear is shown in Fig. 5. The component parts of the apparatus are mounted on a horizontal plate 3 forming part of the pivoted system. Carried on vertical pivots 4, 4' are two horizontal rods 5, 5', terminating in weights 6, 6'. Attached, as shown, to the rods are contact pieces 7, 7' adapted to engage with contact pieces 8, 8' mounted on vertical supports. Attached also to the rods are pieces of soft iron, or mild steel, 9, 9', which engage with the cores of electromagnets 10, 10' carried by the plate 3. Carried by the plate 3 is a reversible electric motor 11, on the spindle of which is carried a boss 12, from which radiate spokes terminating in plane vanes 13, 13.

The operation is as follows. Current is passed through the coils of the electromagnets 10, 10' and this results in the rods 5, 5' taking up positions such that 9 and 9' are in contact with the cores of the magnets. The current is then cut off and the rods are freed. Should the plate 3 be inclined to the horizontal on the pivots $p_1, p_1$, then one or other of the rods will move over so as to bring the contact 7 or 7' against the contact 8 or 8', as the case may be. Should the contact 7 move up against the contact 8, the motor 11 is started up in one direction, and should the contact 7' move up against the contact 8', the motor is started up in the opposite direction. As a result of the passage of the vanes 13, 13 through the air a couple is applied about the pivots $p_2, p_2$, the direction of which, of course, depends on the direction in which the motor rotates. The arrangement is such that in each case the couple about $p_2, p_2$ is such as to cause the pivoted system to turn on $p_1, p_1$, so as to diminish the tilt of the plate 3, with respect to the horizontal on $p_1, p_1$.

In Fig. 6 is shown an alternative arrangement for applying the stabilizing forces. As before, two pivoted levers with electromagnets, stops, etc., are provided (these are not shown in the figure). Pipes are led from the periphery of the casing of one of the gyroscopes, and these terminate in nozzles 19, 19', lying in the line $p_1, p_1$. From the nozzles air issues at high speed. Mounted on vertical pivots 14, 14' are rods 15, 15' which terminate in screens 16, 16'. Carried by the plate 3 are electromagnets 18, 18' adapted to attract soft iron rods 17, 17' attached, as shown, to the rods 15, 15'.

The action is as follows. Current is passed through the coils of the electromagnets 10, 10' (Fig. 5) as before. On this current being cut off one or other of the rods (supposing the plate 3 inclined to the horizontal on the pivots $p_1, p_1$) moves up against its stop, and this results in an electric current being passed through one or other of the electromagnets 18, 18'. One or other of the rods 15, 15' is thus pulled over so as to carry the screen 16 or 16' to one side, with the result that a jet of high speed air leaves the system. The nozzles are so disposed, with respect to the pivots $p_2, p_2$, that when a jet of air issues from the system a couple is applied to the system about the pivots $p_2, p_2$. The arrangement is such that, when a stabilizing couple acts, its direction is such that the inclination of the plate 3 on the pivots $p_1, p_1$ is diminished.

In Fig. 7 is shown a further arrangement for applying stabilizing couples. Carried by the plate 3 are two pivoted rods 19, 19' terminating in weights 23, 23'. The rods are maintained in position, as shown, by stops 20, 20' and springs 21, 21', one end of each spring being attached to the rod, and the other to a support 22, 22'. Carried by the plate 3 are two electromagnets 25, 25' provided, as shown, with elongated pole pieces 26, 26'. Surrounding each pole piece is an aluminium ring 24, 24', secured respectively to the masses 23, 23'. Mounted on the plate 3 are two rods with stops and operating electromagnets as in Fig. 5.

The action is as follows. A current is passed through the coils of the electromagnets 10, 10' (Fig. 5). On this current being interrupted, if the plate 3 is inclined to the horizontal on the pivots $p_1$, $p_1$, one or other of the rods 5, 5' moves up against its stop, and this causes an alternating current to pass through one or other of the electromagnets 25, 25'. Elihu Thomson currents are induced in the aluminium ring 24 or 24' surrounding the core and repulsion takes place. The rod 19 or 19' moves over so as to carry the weight 23 or 23' over to one side. The arrangement is such that the resulting couple causes the pivoted system to turn on the pivots $p_1$, $p_1$ so as to diminish the inclination of the plate 3.

In Fig. 8 is shown an arrangement in which the two rods 33, 33' which, with operating electromagnets and stops, detect the inclination of the plate 3 with respect to the horizontal, on the pivots $p_1$, $p_1$, are carried on sleeves 28, 28', attached to the rod 29, by means of ball races 30, 31, 32. The rods 33, 33' terminate in weights 34, 35.

In Fig. 9 is shown a rod 37, terminating in a weight 38, and carried in a sleeve 36. Attached to the sleeve are two vanes 39, 39' which are immersed in oil contained within the interior 41 of the casing 40. With this addition the rod 37 does not move on the vertical sleeve 36 in response to rapidly applied forces, but yields to long continued forces, such as those due to tilting of the rod with respect to the vertical.

Consider again Fig. 1. Let the gyroscopic system be supposed inclined to the vertical wholly on the pivots $p_2$, $p_2$. If the precessional period of the device is T, then after time T/4 the inclination will be wholly about the pivot axis $p_1$, $p_1$; after time less than T/4 the inclination will be partly about $p_2$, $p_2$ and partly about $p_1$; after time T/2 the inclination will be wholly about $p_2$, $p_2$, and so on.

If at any time a couple is applied to the system about the axis $p_2$, $p_2$ the system will turn about the pivots $p_1$, $p_1$ in a direction depending on the direction, or sense, of the applied couple.

Now, suppose that at a given instant the device is inclined to the vertical wholly on the pivots $p_2$, $p_2$. Precession takes place, and as a result the inclination is gradually transferred to the axis $p_1$, $p_1$. Now let there be applied to the system, at time T/4 a couple about the axis $p_2$, $p_2$ which results in the inclination of the system, with respect to the vertical on the pivots $p_1$, $p_1$, being reduced to zero. After the application of this couple the device will be upright, or very nearly so.

The method of operation will now be clear. A stabilizing couple, about the pivots $p_2$, $p_2$ is brought into existence periodically; this couple reduces to zero any deviation of the system, with respect to the vertical, on the pivots $p_1$, $p_1$.

Consider Fig. 5. Let current be passed through the coils of the electromagnets 10, 10' for time $t$, and let the current be then interrupted. If the system is tilted, with respect to the vertical, on the pivots $p_1$, $p_1$ one of the rods 5, 5' moves up against its stop and the motor 11 comes into action. This results in the application to the system of a stabilizing couple about the pivots $p_2$, $p_2$. Let this stabilizing couple act for time $t$. Current is now passed through the coils of the electromagnets for time $t$, and the current is then interrupted, and so on. So long as the motor 11 is out of action the system is free to precess, and any inclination of the system, with respect to the vertical, on the pivots $p_2$, $p_2$ is transferred gradually to the pivots $p_1$, $p_1$, and is eliminated, wholly or in part, when the motor 11 comes into action.

In Fig. 10 and Fig. 10ª is shown a simple form of rotating commutator suitable for use with this type of stabilizer. The device consists of a disc 45 or the equivalent, on which is mounted an annular ring 47, 48. The part 47 of the ring is constructed of conducting material, and the part 48 of non-conducting material. The disc 45 is driven round very slowly by means of a motor 43 and reduction gearing, contained in the casing 44. A brush 46 rubs on the rotating ring, and when it is in contact with the part 47 current is passed through the electromagnets 10, 10' (Fig. 5). When the brush is in contact with the part 48, the current is interrupted. So long as the brush is situated on the part 47 the rods 5, 5' are held up against the electromagnets 10, 10', and the pivoted system is free to precess. When the brush is against the part 48 of the ring, a couple about the pivots $p_2$, $p_2$ comes into existence if the system should be inclined to the vertical on the pivots $p_1$, $p_1$.

It will be obvious that the form given to this slowly revolving commutator may be varied. 47 represents the time $t$ and 48 the time $t'$: in the present instance these times are equal.

Fig. 11 shows a modification of the invention. Referring to Fig. 11, the two gyroscopes 1, 1' are mounted in frames 5, 5' by means of pivots 2, 2' as shown. Each gyroscope may be turned on the pivots 2, 2, 2', 2', by means of a quadrant 3 or 3' and a worm operated by a milled head 4 or 4' after the manner illustrated in Figs. 3 and 3ª. The frames 5, 5' are pivoted at 6, 6', 6', 6', (one of the pivots only is shown in each case) to a rectangular gimbal frame 7 pivoted at 8, 8 to uprights 9 carried by a base 10. One of the pivots 6 is extended as is also one of the pivots 6′ and to the extensions are attached cranks 11, 11′ as shown. Pivoted to these cranks is a connecting rod 12.

The two gyroscopes 1, 1′ are similar and are spun in opposite directions. The gyroscopes are made bottom heavy on the pivots 6, 6′ by means of weights attached to one or both of the frames 5, 5′, and the frame 7 may be rendered pendulous with respect to the pivots 8, 8 by means of weights 13, 13.

When used on a moving vehicle the device is set up with the pivots 8, 8 lying fore and aft with respect to the vehicle. The gyroscopes are turned on the pivots 2, 2, 2′, 2′ so that there exists a horizontal component of spin sufficient to result in the establishment of a gyroscopic couple, during turning of the vehicle, having the moment required to neutralize the so-called centrifugal couple which acts on the device.

When the pivoted system is inclined to the vertical on the pivots 8, 8 precession takes place on the pivots 6, 6, 6′, 6′. The gyroscopes precess in opposite directions. This construction is important in that the relative shift of the frames 5, 5′ on the pivots 6, 6′ may be utilized to call into existence stabilizing couples applied about the pivots 8, 8. A suitable rotating commutator is used with the device so as to bring the stabilizing couples into existence periodically, after the manner already described.

One convenient method of operating this form of the invention consists in mounting a fan on one of the frames 5, 5′, or in the gimbal frame 7, so that the axis of the fan lies parallel to the line 8, 8. This fan is operated by a reversible electric motor. When the fan is rotating, a reaction couple is applied to the apparatus in a plane perpendicular to the line 8, 8. By means of a commutator, part of which is carried by the frame 5, and part by the frame 5′, or the equivalent, any want of alignment of the frames from the mean position causes the motor to come into action, and the arrangement is such that the reaction couple, which tends to turn the apparatus about the axis 8, 8, causes in fact the frames 5, 5′ to align themselves into the mean position.

I claim:—

1. A gyroscopic stabilizer for use on a moving body comprising a gimbal frame pivotally connectible to the moving body and a gyroscope carrying frame pivoted to said gimbal frame in the same plane, a gyroscope mounted on said second frame and forming therewith a pendulous system, said gyroscope so attached to said second frame as to be adjustable with respect thereto so that the angular momentum of the gyrosc. resolves into two components, one vertical and the other horizontal and of amount equal to the product of the mass of said pendulous system, the distance of the centre of gravity of said pendulous system below the pivot plane and the speed of the moving body.

2. A gyroscopic stabilizer for use on a moving body comprising a gyroscope carrying frame, a gyroscope adjustably supported by said frame, a gimbal frame to which said first frame is pendulously pivoted on horizontal pivots forming a first axis, said gimbal frame being pivotally connectible to the moving body by horizontal pivots forming a second axis perpendicular to the first axis, the first axis being athwart the moving body and the second axis being fore and aft, means whereby the gyroscope may be set with respect to the first frame so that the angular momentum of the gyroscope resolves into two components, one vertical the other horizontal, and of amount such that the product of its amount by the azimuthal rate of turning of the moving body is equal to the centrifugal couple which acts on the system as a consequence of such turning, and means for applying couples about the second axis whereby the first frame may be stabilized with respect to the first axis.

3. Gyroscopic stabilizing apparatus for use on a moving body including a pivoted system, horizontal pendulums carried by said system by movement of which pendulums stabilizing couples are called into play, electromagnets carried by said pivoted system and a rotary commutator for energizing said electromagnets periodically whereby said pendulums are centralized periodically.

4. Gyroscopic stabilizing apparatus for use on a moving body, comprising a gyroscopic system, a gimbal frame to which said system is pivoted, the pivots forming a first axis lying athwart the moving body, the gimbal frame being pivotally connectible to the moving body, the pivots forming a second axis lying fore and aft, the gimbal frame being pendulous with respect to said axis, means for applying periodically couples about the second axis so as to align the gyroscopic system with respect to the gimbal frame, a gyroscope rigidly attached to the gimbal frame with its axis normally horizontal, the angular momentum of the said gyroscope being equal to the product of the mass of the pivoted system, the distance of the centre of gravity of the pivoted system below the second axis, and the speed of the body.

5. Gyroscopic stabilizing apparatus for use on a moving body comprising a gimbal frame pivotally connectible to the moving body by pivots disposed fore and aft with respect to the body and forming a first axis, and a pivoted system pivoted to said gimbal frame by pivots disposed athwart the moving body forming a second axis, means for applying stabilizing couples about the first axis for periodically aligning the pivoted system with respect to said frame and a rotary commutator for separating the periods during which said couples are applied, in the intervals between which periods the system is free to precess about both axes.

6. Gyroscopic stabilizing apparatus for use on a moving body comprising a gyroscopic pendulum, a gimbal frame and two sets of pivots by which the gyroscopic pendulum is carried by said body, said pendulum so mounted that normally the axis of spin of the gyroscope is tilted with respect to the vertical, one set of pivots lying fore and aft with respect to the body, the gimbal frame being pendulous on said set of pivots, and the gyroscopic pendulum being pendulous relatively to said gimbal frame on the other set of pivots.

7. Gyroscopic stabilizing apparatus for use on a moving body comprising a gimbal frame, fore and aft pivots for connecting said frame to the moving body and a gyroscopic system attached to said body by means of said frame, said system comprising a plurality of gyroscopes spinning in different directions, pairs of pivots for attaching said gyroscopes to said gimbal frame, said pairs of pivots forming parallel axes athwart the body, means for linking together said gyroscopes so that they precess with respect to said gimbal frame in different directions, and means for applying periodically to the gyroscopic system couples about the axis of the first pivots for aligning the gyroscopes periodically with respect to one another.

8. Gyroscopic stabilizing apparatus for use on a moving body comprising a gyroscopic system, a gimbal frame and pivots forming first and second axes and means for applying couples periodically about the second axis so as periodically to align the gyroscopic system with respect to the first axis, said system comprising a plurality of gyroscopes spinning in different directions and linked together to precess in different directions.

In testimony whereof I have signed my name to this specification in the presence of two subscribing witnesses.

JAMES GORDON GRAY.

Witnesses:
 ISABEL ROLLO,
 HELEN CRAIG.